United States Patent
Jain et al.

(10) Patent No.: US 10,073,733 B1
(45) Date of Patent: Sep. 11, 2018

(54) SYSTEM AND METHOD FOR IN-MEMORY COMPUTING

(71) Applicant: Purdue Research Foundation, West Lafayette, IN (US)

(72) Inventors: Shubham Jain, West Lafayette, IN (US); Ashish Ranjan, Lafayette, IN (US); Kaushik Roy, West Lafayette, IN (US); Anand Raghunathan, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/693,661

(22) Filed: Sep. 1, 2017

(51) Int. Cl.
  *G11C 11/00* (2006.01)
  *G06F 11/10* (2006.01)

(52) U.S. Cl.
  CPC ...... *G06F 11/1016* (2013.01); *G06F 11/1044* (2013.01)

(58) Field of Classification Search
  CPC ............ G11C 13/0669; G11C 13/0004; G11C 13/0007; G11C 2213/79
  USPC .................................................. 365/148, 158
  See application file for complete search history.

(56) References Cited

U.S. PATENT DOCUMENTS

| | | | |
|---|---|---|---|
| 8,711,646 B2 * | 4/2014 | Ong ....................... | G11C 29/06 365/148 |
| 9,224,447 B2 | 12/2015 | Wang et al. | |
| 2013/0028014 A1 * | 1/2013 | Guo ........................ | G11C 7/062 365/163 |

OTHER PUBLICATIONS

K. W. Kwon, X. Fong, P. Wijesinghe, P. Panda, and K. Roy. High-Density and Robust STT-MRAM Array Through Device/Circuit/Architecture Interactions. IEEE Transactions on Nanotechnology, 14(6):1024-1034, Nov. 2015.

Wang Kang, Weisheng Zhao, Zhaohao Wang, Yue Zhang, Jacques-Olivier Klein, Youguang Zhang, Claude Chappert, and Dafin'e Rav-Elosona. A low-cost built-in error correction circuit design for STT-MRAM reliability improvement. Microelectronics Reliability, 53(9):1224-1229, 2013.

M. Kang, M. S. Keel, N. R. Shanbhag, S. Eilert, and K. Curewitz. An energy-efficient VLSI architecture for pattern recognition via deep embedding of computation in SRAM. In 2014 IEEE International Conference on Acoustics, Speech and Signal Processing (ICASSP), pp. 8326-8330, May 2014.

Shuangchen Li, Gong Xu, Qiaosha Zou, Jishen Zhao, Yu Lu, and Yuan Xie. Pinatubo: A processing-in-memory architecture for bulk bitwise operations in emerging non-volatile memories. In Proceedings of the 53rd Annual Design Automation Conference, DAC '16, pp. 173:1-173:6, New York, NY, USA, 2016. ACM.

(Continued)

*Primary Examiner* — Son Dinh
(74) *Attorney, Agent, or Firm* — Piroozi-IP, LLC

(57) ABSTRACT

A memory capable of carrying out compute-in-memory (CiM) operations is disclosed. The memory includes a matrix of bit cells having a plurality of bit cells along one or more rows and a plurality of bit cells along one or more columns, each bit cell having a value stored therein, an address decoder configured to receive addresses and activate two or more of the rows associated with the addresses, and a sensing circuit coupled to each column of bit cells, and configured to provide two or more outputs, wherein each output is associated with at least one compute operation performed on values stored in the bit cells in the column.

20 Claims, 14 Drawing Sheets

(56) References Cited

OTHER PUBLICATIONS

V. Seshadri, K. Hsieh, A. Boroum, D. Lee, M. A. Kozuch, O. Mutlu, P. B. Gibbons, and T. C. Mowry. Fast Bulk Bitwise and and or in DRAM. IEEE Computer Architecture Letters, 14(2):127-131, Jul. 2015.

Qing Guo, Xiaochen Guo, Ravi Patel, Engin Ipek, and Eby G. Friedman. AC-DIMM: Associative Computing with STT-MRAM. In Proceedings of the 40th Annual International Symposium on Computer Architecture, ISCA '13, pp. 189-200, New York, NY, USA, 2013. ACM.

Jintao Zhang, Zhuo Wang, and Naveen Verma. A machine-learning classifier implemented in a standard 6T SRAM array. In VLSI Circuits (VLSI-Circuits), 2016 IEEE Symposium on, pp. 1-2. IEEE, Jun. 2016.

Q. Zhu, K. Vaidyanathan, O. Shacham, M. Horowitz, L. Pileggi, and F. Franchetti. Design automation framework for application-specific logic-in-memory blocks. In 2012 IEEE 23rd International Conference on Application-Specific Systems, Architectures and Processors, pp. 125-132, Jul. 2012.

J. T. Pawlowski. Hybrid memory cube (HMC). In Hot Chips, vol. 23, 2011.

Dong Uk Lee, Kyung Whan Kim, Kwan Weon Kim, Hongjung Kim, Ju Young Kim, Young Jun Park, Jae Hwan Kim, Dae Suk Kim, Heat Bit Park, Jin Wook Shin, Jang Hwan Cho, Ki Hun Kwon, Min Jeong Kim, Jaejin Lee, Kun Woo Park, Byongtae Chung, and Sungjoo Hong. 25.2 A 1.2 V 8Gb 8-channel 128GB/s high-bandwidth memory (HBM) stacked DRAM with effective microbump I/O test methods using 29nm process and TSV. In Proc. ISSCC, pp. 432-431. IEEE, 2014.

D. Strukov. The area and latency tradeoffs of binary bit-parallel BCH decoders for prospective nanoelectronic memories. In 2006 Fortieth Asilomar Conference on Signals, Systems and Computers, pp. 1183-1187, Oct. 2006.

\* cited by examiner

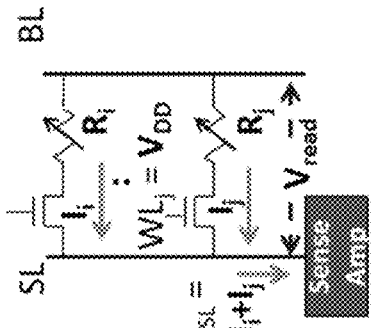
FIG. 1C
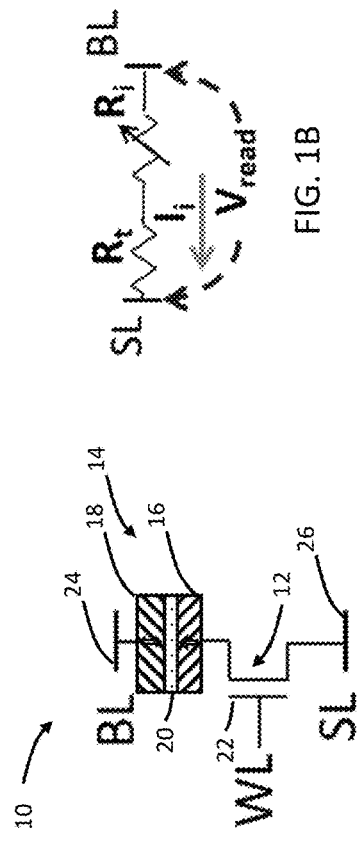
FIG. 1G
FIG. 1B
FIG. 1F
FIG. 1A
FIG. 1E
FIG. 1D

FIG. 12A - Array Alignment

FIG. 12B - Row Interleaving

FIG. 12C - Spare Row and Special Write

FIG. 12D - Column Replication

Type I
DataArray A[],B[]
FOR i: 0 to N-1
  A[i] OP B[i]

Type II
DataArray A[],B[]
FOR i: 0 to N-1
  Special Write A[i]
  A[i] OP B[i]

Type III
DataArray A[],B[]
(Size(A) << Size (B))
A[i] OP B[j]
(Random Access)

SYSTEM AND METHOD FOR IN-MEMORY COMPUTING

TECHNICAL FIELD

The present disclosure generally relates to integrated circuit memory systems, and more particularly to systems and methods for in-memory computing.

BACKGROUND

This section introduces aspects that may help facilitate a better understanding of the disclosure. Accordingly, these statements are to be read in this light and are not to be understood as admissions about what is or is not prior art.

The growth in data sets and increase in the number of cores place high demands on the memory systems of modern computing platforms. Complementary metal oxide semiconductors (CMOS) memories including static read access memory (SRAM) and embedded dynamic read access memory (DRAM) have been the mainstays of memory design for the past several decades. However, recent technology scaling challenges in CMOS memories, along with an increased demand for memory capacity and performance, have fueled an active interest in alternative memory technologies. One such alternative memory technology is Spintronic memories.

Spintronic memories have emerged as a promising candidate for future memories based on a plurality of advantageous characteristics such as non-volatility, high density, and near-zero leakage. In particular, Spin Transfer Torque Magnetic RAM (STT-MRAM) has garnered significant interest. Regardless of the technology, movement of data from bit cells in the memory to the processor and back (across the bit lines, memory interface, and system interconnect) is a bottleneck to performance and energy efficiency of computing systems. One way of addressing this bottleneck is in-memory computing, whereby a close integration of logic and memory, variedly referred to in the literature as logic in-memory, compute-in-memory, processing-in-memory, etc., occurs. In-memory computing may be classified into three categories—moving logic closer to memory, performing computations within memory structures, and embedding nonvolatile storage elements within logic. The first two approaches address the efficiency of performing active computation, whereas the third addresses the challenge of memory energy during idle periods.

Performing computations within memory structures requires enabling multiple word lines, investigated by others to perform computations within off-chip non-volatile memories (NVM)s. However, process variations, particularly with respect to on-chip memories, and the typical stochastic nature of STT-MRAM make the solutions provided in the art for on-chip in-memory computing inadequate, and particularly for on-chip STT-MRAM.

Therefore, there is an unmet need for a novel architecture and method to utilize in-memory computing with on-chip STT-MRAM memories.

SUMMARY

A memory capable of carrying out compute-in-memory (CiM) operations is disclosed. The memory includes a matrix of bit cells having a plurality of bit cells along one or more rows and a plurality of bit cells along one or more columns, each bit cell having a value stored therein. The memory further includes an address decoder configured to receive addresses and activate two or more of the rows associated with the addresses. Additionally, the memory includes a sensing circuit coupled to each column of bit cells, and configured to provide two or more outputs, wherein each output is associated with at least one compute operation performed on values stored in the bit cells in the.

A method of performing in-memory computing (CiM) is disclosed. The method includes providing a matrix of bit cells having a plurality of bit cells along one or more rows and a plurality of bit cells along one or more columns, each bit cell having a value stored therein. The method further includes decoding addresses and activating two or more of the rows associated with the addresses. Additionally, the method includes sensing outputs of multiple in-memory compute operations performed simultaneously on values stored in the bit cells in a column by one or more sensing circuits each coupled to an associated column of bit cells.

BRIEF DESCRIPTION OF DRAWINGS

FIG. 1A is a schematic of a magnetic tunnel junction based bit cell having a magnetic junction stack disposed between a bit line (BL) and a source line (SL) with an access transistor controlled by a word line disposed therebetween.

FIG. 1B is a schematic of resistive equivalence of the bit cell of FIG. 1A.

FIG. 1C is a schematic of two bit cells shown in FIG. 1A coupled to each other.

FIG. 1D is a schematic of a sense amplifier for an OR operation.

FIG. 1E is a schematic of a sense amplifier for an AND operation.

FIG. 1F is a graph showing threshold currents for identification of OR and AND operations.

FIG. 1G is a table describing in-memory add operations.

FIGS. 12A-12D are schematics that show three general computation patterns observed in various target applications.

DETAILED DESCRIPTION

Figure 2:
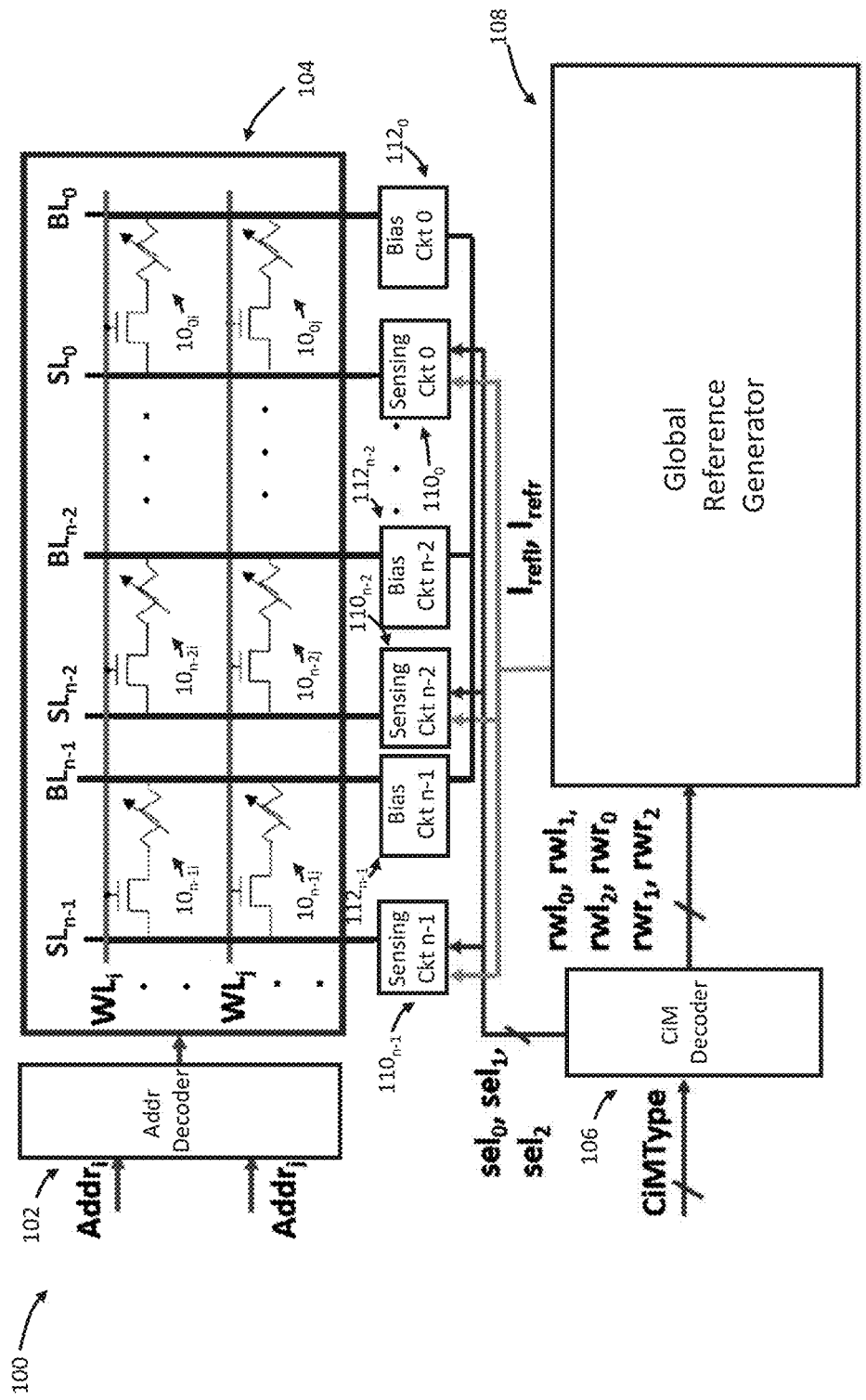
FIG. 2 is a schematic of a memory system and the associated components including a global reference generator, one or more sensing circuits, and one or more biasing circuit.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel architecture and method for performing in-memory computing is provided. Referring to FIG. 1A a typical spin-torque transfer magnetic read access memory (STT-MRAM) bit cell 10 is shown. The STT-MRAM bit cell 10 includes an access transistor 12 and a magnetic tunnel junction (MTJ) stack 14. The MTJ Stack 14 is positioned between a high side bit line (BL) node 24 and the access transistor 12 and includes a ferromagnetic pinned layer 16 (which has a fixed magnetic orientation) and a free layer 18 (whose orientation can be switched), separated by a tunneling oxide barrier 20. The access transistor is positioned between the MTJ stack 14 and a source line (SL) node 26 and is controlled by a gate 22. The logic state stored in the bit cell depends on the relative orientation between the free layer 18 and the pinned layer 16. According to one embodiment, parallel orientation (i.e., both layers having the same orientation) represents "0" and antiparallel orientation represents "1". A read operation involves activating the gate 22 of the access transistor 12 identified as a word line (WL) node and applying a bias voltage (Vread) between the BL node 24 and the SL node 26. The resulting read current through the STT-MRAM bit cell 10 is compared against a global reference current to determine the logic state stored. A write operation is performed by passing a current greater than a critical switching current ($I_c$) of the MTJ stack 14 (critical current is the current that can cause the free layer to switch from one orientation to another) for a minimum switching duration. The current direction to write a "1" vs. a "0" differs based on the logic value to be written into the STT-MRAM nit cell 10. A read operation requires a small current (i.e., much smaller than the critical switching current) to be passed through the STT-MRAM bit cell 10. This read operation can be accomplished based on a voltage-based sensing scheme wherein a small known current is applied to the BL node 24 and resistance across the STT-MRAM bit cell 10 is measured. A higher resistance represents a "1"—representing antiparallel orientation—while a lower resistance represents a "0"—representing parallel orientation—where resistance is measured by comparing the voltage across the STT-MRAM bit cell 10 against a reference voltage Vref (a voltage lower than the voltage associated with the high resistance and higher than the voltage associated with the low resistance); or based on a current-based sensing wherein a small voltage is applied across the STT-MRAM cell 10 and the current through the STT-MRAM cell 10 is measured, where a large current represents a "0", representing a parallel orientation, and small current represents a "1".

Writes in STT-MRAM cell 10 are stochastic in nature, and the magnitude and duration of the write current determines the write failure rate. Besides write failures, the STT-MRAM cell 10 may also suffer from read decision failures, where the data stored in a bit cell is incorrectly read due to process variations, and read disturb failures where a read operation accidentally writes into the cell. Another key design metric of the STT-MRAM cell 10 is the retention time, which is the duration for which the data stored in an idle bit cell is retained. Lowering the retention time makes switching the MTJ easier, since it decreases Ic. However, it also makes the bit cell more prone to retention failures due to thermal disturbances.

One aspect of STT compute-in-memory (STT-CiM) is to enable multiple word lines simultaneously in an STT-MRAM array, leading to multiple bit cells being connected to each bit line. Advantageously, such an operation is feasible in STT-MRAMs since the bit cells are resistive. In contrast, enabling multiple word lines in other commonly used memory structures (e.g., SRAM) can lead to short-circuit paths through the memory array, leading to loss of data stored in their bit cells.

Referring to FIG. 1B, a schematic model of the resistive nature of an STT-MRAM cell is depicted. In FIG. 1B, Rt represents the on resistance of the access transistor 12 and Ri the resistance of the MTJ stack 14. The current $I_i$ equals voltage across BL (bit line of a column of bit cells) and SL (source line of a column of bit cells) divided by the sum of $R_i$ and $R_t$. It is $I_i$ that is compared with a reference current to determine the state of the bit cell during a read operation. Referring to FIG. 1C, a series of exemplary bit cells (denoted with subscripts i . . . j) are connected to a common bit line, as discussed above and as is possible with STT-MRAM. When a voltage (Vread) is applied between the column bit line (BL) and the column source line (SL), the net current (Ii) flowing through each bit cell can take two possible values ($I_P$, and $I_{AP}$) depending on the configuration of the MTJ stack 14, thereby resulting in four different combinations (e.g., if only two bit cells were connected as shown in FIG. 1C), as provided in Table 1, below. A read operation involves using a sensing mechanism to distinguish between these current values.

TABLE 1

| Bit cell current for a read operation | |
|---|---|
| $R_i$, $R_j$, | $I_{SL}$ |
| $R_P$, $R_P$ | $I_{P-P}$ |
| $R_P$, $R_{AP}$ | $I_{P-AP}$ |
| $R_{AP}$, $R_P$ | $I_{AP-P}$ |
| $R_{AP}$, $R_{AP}$ | $I_{AP-AP}$ |

By measuring $I_{SL}$ (which is addition of $I_i$, net current passing through bit cell I, and $I_j$ which is the net current passing through bit cell j) and comparing the value to a reference current ($I_{ref}$), the states of an exemplary two parallel connected bit cells can be determined. FIG. 1C demonstrates a Compute-in-Memory (CiM) operation, where two word lines ($WL_i$ and $WL_j$) are enabled, and a voltage bias (Vread) is applied to the bit line. The resultant current flowing through the source line (denoted $I_{SL}$) is a summation of the currents flowing through each of the bit cells ($I_i$ and $I_j$), which in turn depends on the logic states stored in these bit cells. The possible values of $I_{SL}$ are provided in Table 1. A novel and enhanced sensing mechanisms, according to the present disclosure, further discussed below, can be used to distinguish between these values and thereby compute logic functions of the values stored in the enabled bit cells. Referring to FIG. 1D, a reference value for an OR gate is compared with a value representing $I_{SL}$. The comparison can be based on comparing voltages representing currents or currents directly (i.e., a voltage, e.g., across a sense resistor, can be used to represent a current; or the currents can be compared directly using, e.g., current mirrors), as further described below. In FIG. 1D, a voltage (or current depending on whether the reference is voltage- or current-based) representing a reference voltage for an OR gate ($I_{ref-or}$) is compared with a voltage representing $I_{SL}$ from bit cells forming an OR gate (i.e., a 0 output if both bit cells are holding 0 and 0, but otherwise a 1). If $I_{SL}$ is less than $I_{ref-or}$ then the output on the positive output pin ($O_{OR}$) is a 0, while the output on the negative output pin ($O_{NOR}$) is a 1; if, however, $I_{SL}$ is equal or greater than $I_{ref-or}$ then the output on the positive pin is 1, while the output on the negative output pin is a 0. Therefore, by choosing a proper $I_{ref-or}$ value, the sense amplifier in FIG. 1D can provide an OR function or a NOR function depending on which output is used. Similarly, referring to FIG. 1E, a voltage (or current depending on whether the reference is voltage- or current-based) representing a reference voltage for an AND gate ($I_{ref-and}$) is compared with a voltage representing $I_{SL}$ from bit cells forming an AND gate (i.e., a 1 output if both bit cells are holding 1 and 1, but otherwise a 0). If $I_{SL}$ is greater than $I_{ref-and}$ then the output on the positive output pin ($O_{AND}$) is a 1, while the output on the negative output pin ($O_{NAND}$) is a 0; if, however, $I_{SL}$ is less than or equal to $I_{ref-and}$ then the output on the positive pin is 0, while the output on the negative output pin is a 1. Therefore, by choosing a proper $I_{ref-and}$ voltage, the sense amplifier in FIG. 1E can provide an AND function or a NAND function depending on which output is used. Referring to FIG. 1F, the relative values of $I_{ref-or}$ and $I_{ref-and}$ with respect to $I_{AP-AP}$, $I_{AP-P}$ (or $I_{P-AP}$), and $I_{P-P}$ are provided. While two-input logic functions are shown in FIGS. 1C, 1D, 1E, and 1F, it should be appreciated that these functions can have two or more inputs. For example, a three-input AND gate function can be achieved by coupling bit lines from three-bit cells. With three inputs, 8 different possibilities exist (similar to Table 1 the resistance values are $R_{AP-AP-AP}$, $R_{AP-AP-P}$, $R_{AP-P-AP}$, $R_{AP-P-P}$, $R_{P-AP-AP}$, $R_{P-AP-P}$, $R_{P-P-AP}$, $R_{P-P-P}$). Similar to FIG. 1F, a three-input OR gate can be simulated by constructing a reference current ($I_{ref-or}$) which is larger than $I_{AP-AP-AP}$ but smaller than the next value (i.e., $I_{AP-AP-P}$, or $I_{AP-P-AP}$, or $I_{P-AP-AP}$). Similarly, a three-input AND gate can be simulated by constructing a reference current ($I_{ref-and}$) which is smaller than $I_{P-P-P}$ but larger than the next value (i.e., $I_{P-P-AP}$, or $I_{P-AP-P}$, or $I_{AP-P-P}$). With additional inputs the number of combinations increase as a power of $2^n$, where n is the number of inputs. For example, a four-input logic gate will have $2^4=16$ possible combinations, requiring a reference voltage generator that can distinguish between a case where all four-bit cells have the same value (P or AP) and a case where one of the bit cells has a different value.

While not shown, a bit-wise XOR gate can also be achieved using the CiM approach discussed herein. A bit-wise XOR operation is realized when the two sensing schemes shown in FIGS. 1D and 1F are used in tandem, and $O_{AND}$ and $O_{NOR}$ are fed to a CMOS NOR gate. In other words, $O_{XOR}=O_{AND}$ NOR $O_{NOR}$.

Table 2 below provides a more comprehensive schedule for current values representing various logic functions.

TABLE 2

Possible outputs for various sensing schemes

| $I_{SL}$ | $O_{OR}$ | $O_{NOR}$ | $O_{AND}$ | $O_{NAND}$ | $O_{XOR}$ |
|---|---|---|---|---|---|
| $I_{AP-AP}$ | 0 | 1 | 0 | 1 | 0 |
| $I_{AP-P}$ | 1 | 0 | 0 | 1 | 1 |
| $I_{P-AP}$ | 1 | 0 | 0 | 1 | 1 |
| $I_{P-P}$ | 1 | 0 | 1 | 0 | 0 |

It should be appreciated that since all the logic operations described above are symmetric in nature, it is not necessary to distinguish between the cases where the bit cells connected to a bit line store "10" vs. "01".

An ADD operation is realized by leveraging the bitwise logical operations, as illustrated in FIG. 1G. Suppose $A_n$ and $B_n$ (the $n^{th}$ bits of two words, A and B) are stored in two different bit cells of the same column within an STT-CiM array. To compute a full adder logic function (n-th stage of an adder that adds words A and B), as shown in FIG. 1G, $A_n$ and $B_n$ are not required individually; rather, knowing $A_n$ XOR $B_n$ and $A_n$ AND $B_n$ suffices to compute $S_n$ (the sum) and $C_n$ (the carry out) given $C_{n-1}$ (carry input from the previous stage). It should be appreciated that the sensing schemes discussed above provides a mechanism to perform the bitwise XOR and AND operations simultaneously, thereby performing an ADD operation with a single array access. FIG. 1G also expresses the ADD operation in terms of the outputs of bitwise operations, OAND and OXOR. Three additional logic gates are required to enable this computation.

With these exemplary logical operations discussed, reference is now made to FIG. 2 where a schematic of a CiM system 100 is provided. The system 100 includes an address decoder 102, a matrix of bit cells 104, a CiM decoder 106, a global reference generator 108, one or more sensing circuits $110_0$-$110_{n-1}$, and one or more biasing circuit $112_0$-$112_{n-1}$ ($BC_0 \ldots BC_{n-1}$). The matrix of bit cells 104 includes one or more sets of complementary bit cells along a first direction denoted with subscripts of $0 \ldots n-2$ to $n-1$, with each set having two or more bit cells along a second direction denoted by the subscripts $i \ldots j$, collectively generating a two-dimensional matrix. In FIG. 2, bit cells 10 are denoted with their corresponding position in the two-dimensional matrix. For example, the first set of complementary bit cells is denoted with subscript 0, with two or more bit cells (i ... j) depicted in this set, resulting in bit cells $10_{0i}$ to $10_{0j}$, and the last set of complementary bit cells is denoted with subscript n−1, with two or more bit cells (i ... j) depicted in this set, resulting in bit cells $10_{n-1i}$ to $10_{n-1j}$. The bit lines of each bit cell in each set of complementary bit cells is coupled to a corresponding bias circuit $112_0 \ldots 112_{n-1}$. Therefore, the bit lines of $10_{0i}$ to $10_{0j}$ bit cells are coupled to the bias circuit 0 ($112_0$), the bit lines of $10_{n-2i}$ to $10_{n-2j}$ bit cells are coupled to the bias circuit n−2 ($112_{n-2}$), and the bit lines of $10_{n-1i}$ to $10_{n-1j}$ bit cells are coupled to the bias circuit n−1 ($112_{n-1}$). The source lines of each bit cell in each set of complementary bit cells is coupled to a corresponding sensing circuit $110_0 \ldots 110_{n-1}$ ($SC_0 \ldots SC_{n-1}$). Therefore, the source lines of $10_{0i}$ to $10_{0j}$ bit cells are coupled to the sensing circuit 0 ($110_0$), the source lines of $10_{n-2i}$ to $10_{n-2j}$ bit cells are coupled to the sensing circuit n−2 ($110_{n-2}$), and the source lines of $10_{n-1i}$ to $10_{n-1j}$ bit cells are coupled to the sensing circuit n−1 ($110_{n-1}$). Similarly, the word lines of all bit cells along the first direction is coupled to the address decoder 102. Therefore, the word lines of $10_{0i}$ to $10_{n-2i}$ and $10_{n-1i}$ bit cells are coupled to the word line i ($WL_i$) of the address decoder 102. The word lines of $10_{0j}$ to $10_{n-2j}$ and bit cells are coupled to the word line j ($WL_j$) of the address decoder 102.

Figure 3:
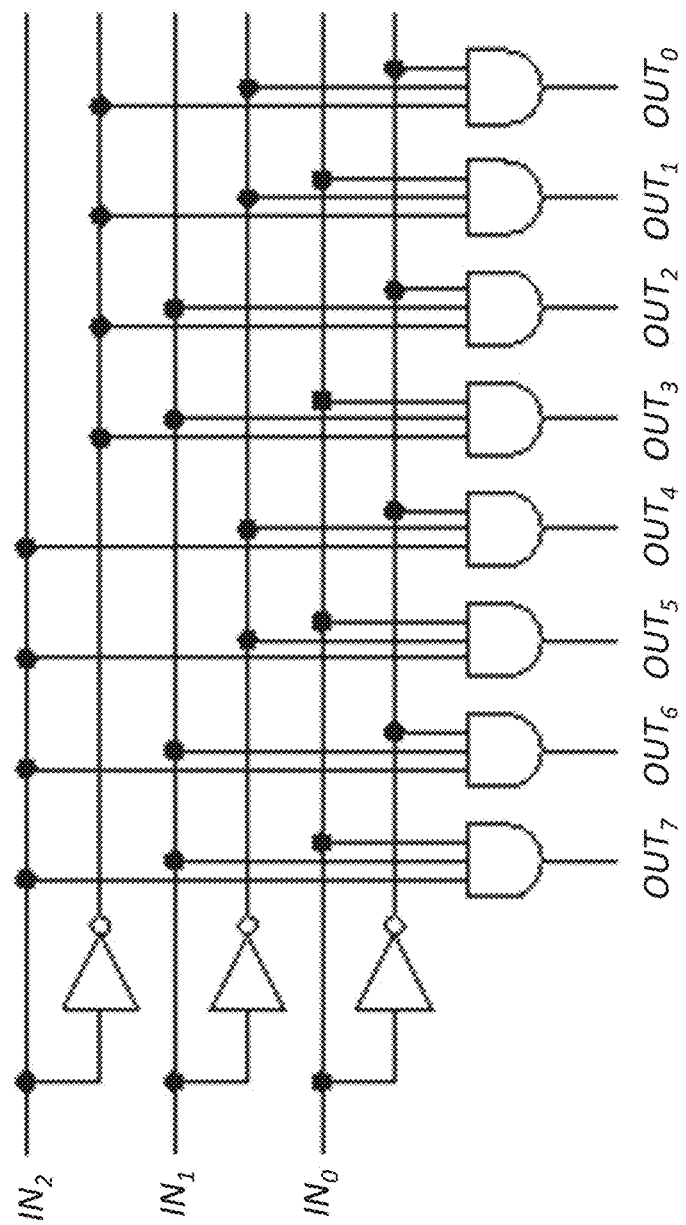
FIG. 3 is a schematic of a 3-8 decoder.

The CiM decoder 106 receives an input CiMType from a processor (further described in reference to FIG. 13) which is a coded selection of the desired in-memory computation. The CiM decoder 106 interprets this input and generates appropriate control signals ($rwl_0$, $rwl_1$, $rwl_2$, $rwr_0$, $rwr_1$, $rwr_2$, $sel_0$, $sel_1$, and $sel_2$) to perform the desired logic operation. The CiMType input, according to one embodiment may be a three-line signal from the processor to the CiM decoder 106. The three lines are decoded by the CiM decoder into 8 possibilities. An exemplary 3-8 decoder is depicted in FIG. 3. The 3-line input ($IN_0$, $IN_1$, and $IN_2$) are decoded to one of 8-line output ($OUT_0$, . . . $OUT_7$) which represent one of the 8 possibilities of logical operations and the associated control signal values for $rwl_0$, $rwl_1$, $rwl_2$, $rwr_0$, $rwr_1$, $rwr_2$, $sel_0$, $sel_1$, and $sel_2$ according to Table 3, below. The control signals listed above are used in the global reference generator 108 ($rwl_0$, $rwl_1$, $rwl_2$, $rwr_0$, $rwr_1$, $rwr_2$) as well as the sensing circuits $110_0$ . . . ($sel_0$, $sel_1$, and $sel_2$). The 3-8 decoder is paired with a secondary decoder circuit (not shown) to convert the decoded operation (i.e., one of the 8) to the listing of the control signals provided in Table 3. The secondary decoder circuit alone or in combination with the 3-8 decoder depicted in FIG. 3 can be generated via a hardware description language (HDL), such as Verilog or VHDL, and synthesized with a synthesis engine.

and $rwr_2$ are all also set to 0. This arrangement of selections results in $I_{refl}$ having a value based on $R_{REF}$ and $R_{AP}$. As discussed with reference to FIG. 1F, $I_{SL}$ currents greater than $I_{ref-or}$ represent a 1 while $I_{SL}$ current less than $I_{ref-or}$ represent a 0 when $I_{ref-or}$ is between $I_{AP-AP}$ and $I_{AP-P}$ or $I_{P-AP}$. With the selections shown in Table 3 for the OR functionality (i.e., $rwl_0$ and $rwl_1$ set to 1, and $rwl_2$, $rwr_0$, $rwr_1$, $rwr_2$ set to 0), $I_{refl}$ is based on $R_{AP}$ and $R_{REF}$. Furthermore, as will be seen in FIG. 5, $sel_0$, and $sel_1$ are both set to 1 while $sel_1$ is a don't care. This configuration allows $I_{SL}$ to be compared with a reference value based on $R_{AP}$ and $R_{REF}$.

Figure 4B:
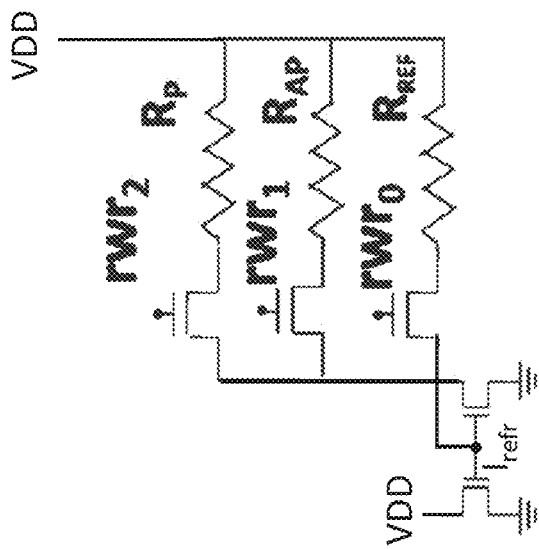
FIGS. 4A and 4B are schematics of parts of an exemplary global reference generator of FIG. 2.
Figure 4A:
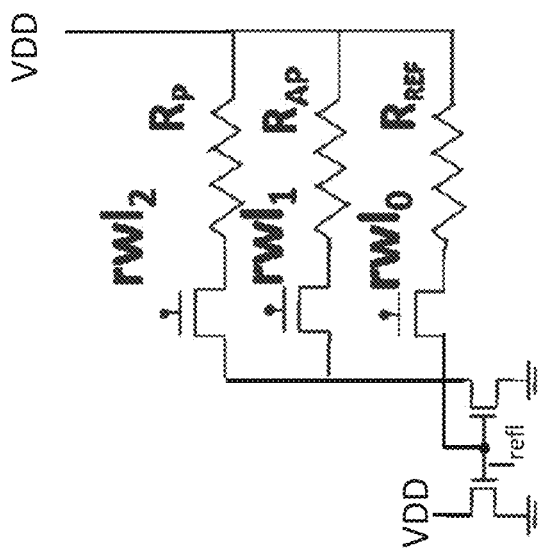

It should be noted that $I_{refl}$ and $I_{refr}$ are both shown as gate-to-source voltages (VGS) of their respective current mirrors. As known to a person having ordinary skill in the art, the current mirror provides a mirrored current without the use of a resistor and the VGS represent the voltage at the FETs' gates to generate the desired currents. In the embodiment shown in FIGS. 4A and 4B, VGS voltages are used to represent $I_{refl}$ and $I_{refr}$. However, $I_{refl}$ and $I_{refr}$ in an alternative embodiment (not shown), current values (instead of voltages) can be passed on to the sensing circuits.

Figure 5:
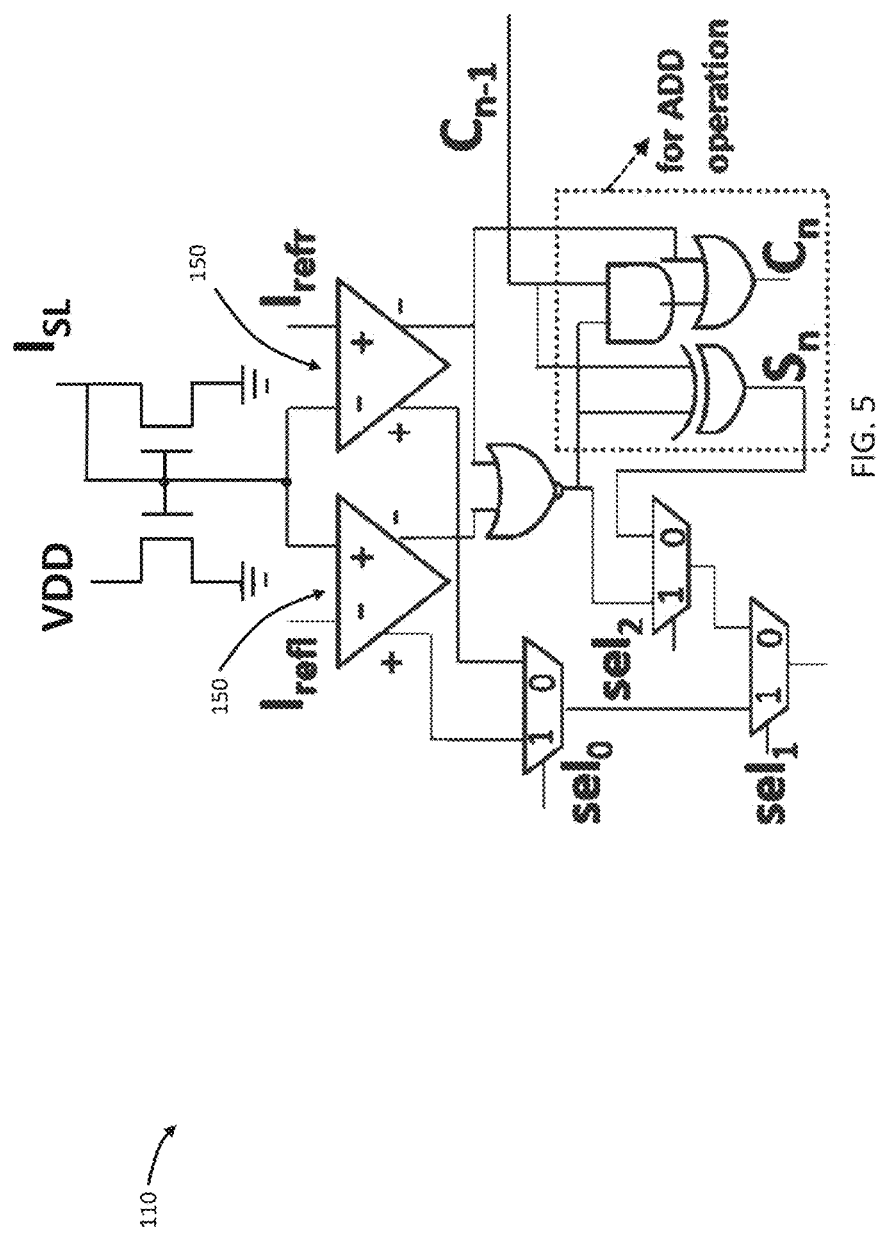
FIG. 5 is a schematic of an exemplary sensing circuit of FIG. 2.

The sensing circuits $110_0$ to $110_{n-1}$ are shown in greater detail in FIG. 5. A MOSFET current mirror receives $I_{SL}$ as input and provides a mirrored current from VDD as its output. $V_{GS}$ of both MOSFETs is the same and fed into a first and second sense amplifiers 150 (to the positive input of the first sense amplifier 150 and to the negative input of the second sense amplifier 150). $I_{refl}$ and $I_{refr}$ are also fed into the first and second sense amplifiers 150 ($I_{refl}$ to the negative input of the first sense amplifier 150 and $I_{refr}$ to the positive input of the second sense amplifier 150). $sel_0$, $sel_1$, and $sel_1$

TABLE 4

Control signals for various logical operations

| $IN_2IN_1IN_0$ | Operation | $rwl_0$ | $rwl_1$ | $rwl_2$ | $rwr_0$ | $rwr_1$ | $rwr_2$ | $sel_0$ | $sel_1$ | $sel_2$ |
|---|---|---|---|---|---|---|---|---|---|---|
| 000 | READ | 1 | 0 | 0 | 0 | 0 | 0 | 1 | 1 | X |
| 001 | NOT | 0 | 0 | 0 | 1 | 0 | 0 | 0 | 1 | X |
| 010 | AND | 1 | 0 | 1 | 0 | 0 | 0 | 1 | 1 | X |
| 011 | OR | 1 | 1 | 0 | 0 | 0 | 0 | 1 | 1 | X |
| 100 | NAND | 0 | 0 | 0 | 1 | 0 | 1 | 0 | 1 | X |
| 101 | NOR | 0 | 0 | 0 | 1 | 1 | 0 | 0 | 1 | X |
| 110 | XOR | 1 | 1 | 0 | 1 | 0 | 1 | 0 | 0 | 1 |
| 111 | ADD | 1 | 1 | 0 | 1 | 0 | 1 | 0 | 0 | 0 |

The address decoder 102 receives addresses of bit cells to be used for carrying out the desired in-memory computation from the processor. The address decoder 102 decodes the received addresses and thereby activates word lines associated with the received addresses. The address decoder 102 includes two or more decoders coupled to the word lines of the bit cells. Such a configuration allows any of the two or more decoders to activate any random word lines.

Sensing circuits $110_0$ to $110_{n-1}$ shown in FIG. 2 receive reference currents $I_{refl}$ and $I_{refr}$ (or reference voltages depending on whether voltages are used to compare to the reference values or currents are used) to discern between various levels needed for different logic gate functions as described above in reference to two-input logic gates (as shown in FIGS. 1D-1F) and three or more input logic gates, as described above. The global reference generator circuit 108 is shown in greater detail in FIGS. 4A and 4B. For each of $I_{refl}$ and $I_{refr}$ the global reference generator circuit 108 provides a current mirror controlled by $rwl_0$, $rwl_1$, $rwl_2$ and $rwr_0$, $rwr_1$, $rwr_2$, respectively. For example, for an OR gate, $rwl_0$, $rwl_1$ are set to 1 while $rwl_2$ is set to 0 and $rwr_0$, $rwr_1$, provide a network of multiplexers that can be used to output the desired logical function based on Table 3.

Figure 6:
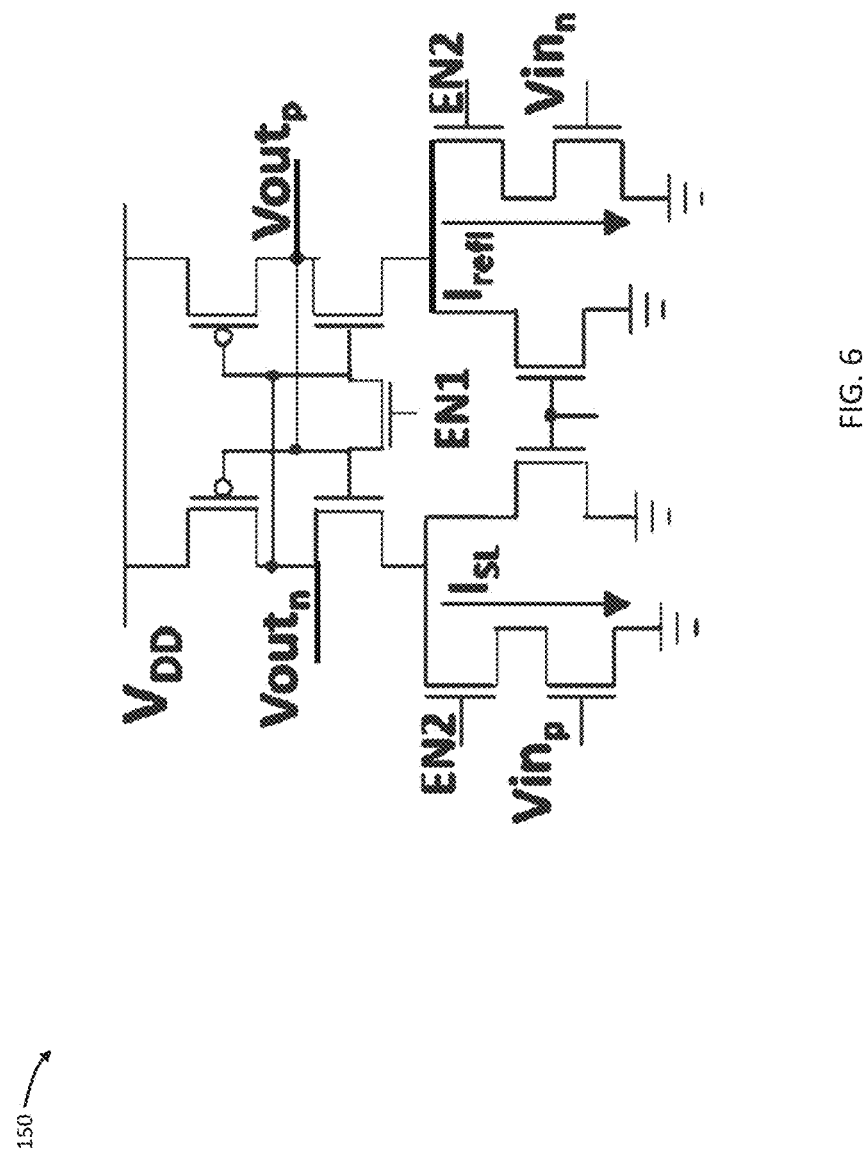
FIG. 6 is a schematic of an exemplary sense amplifier of FIG. 5.

The first sense amplifier 150 as an example of the first or second sense amplifiers 150 is shown in greater detail in FIG. 6. The sense amplifier shown in FIG. 6, includes a network of current mirrors enabled by EN1 and EN2 inputs. Amplifiers' other inputs include $Vin_p$ and $Vin_n$ and their outputs include $Vout_n$ and $Vout_p$. For clarity, the sense amplifier is shown for the $I_{refl}$ branch of the sense circuit shown in FIG. 5. The $I_{refl}$ shown is a reconstructed current based on the VGS value of the current mirror discussed above with respect to FIG. 4A.

Write peripheral circuits as compared to traditional memory controllers remain unchanged, as write operations are the same as standard STT-MRAM, known to a person having ordinary skill in the art. A READ operation is performed by enabling a single word line and setting $sel_0$, $sel_1$, and $rwl_0$ to logic '1'. A READ operation is contrasted with a CiM operation wherein two word lines are initiated and by setting CiMType to the appropriate value, as provided in Table 3 which results in computing the desired function of the enabled words.

Figure 7A:
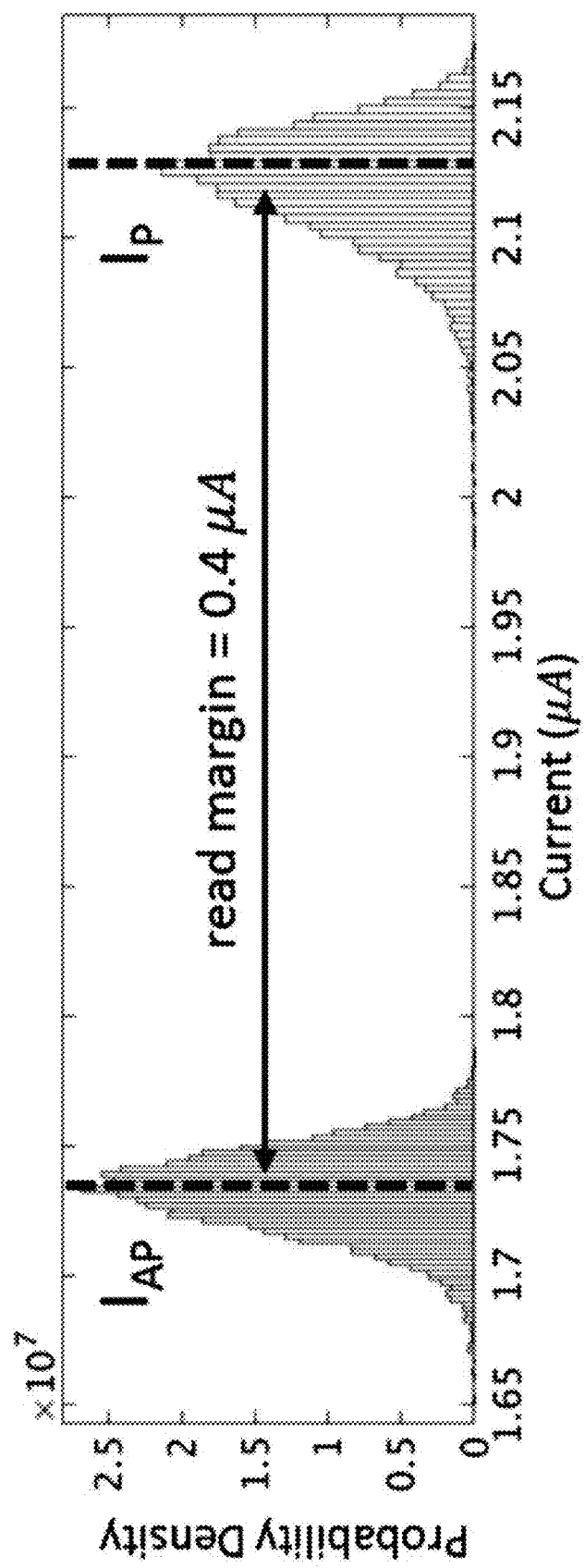
FIG. 7A is a graph of probability of currents during a normal read operation, showing a read margin between an antiparallel configuration of the bit cell and a parallel configuration.
Figure 7B:
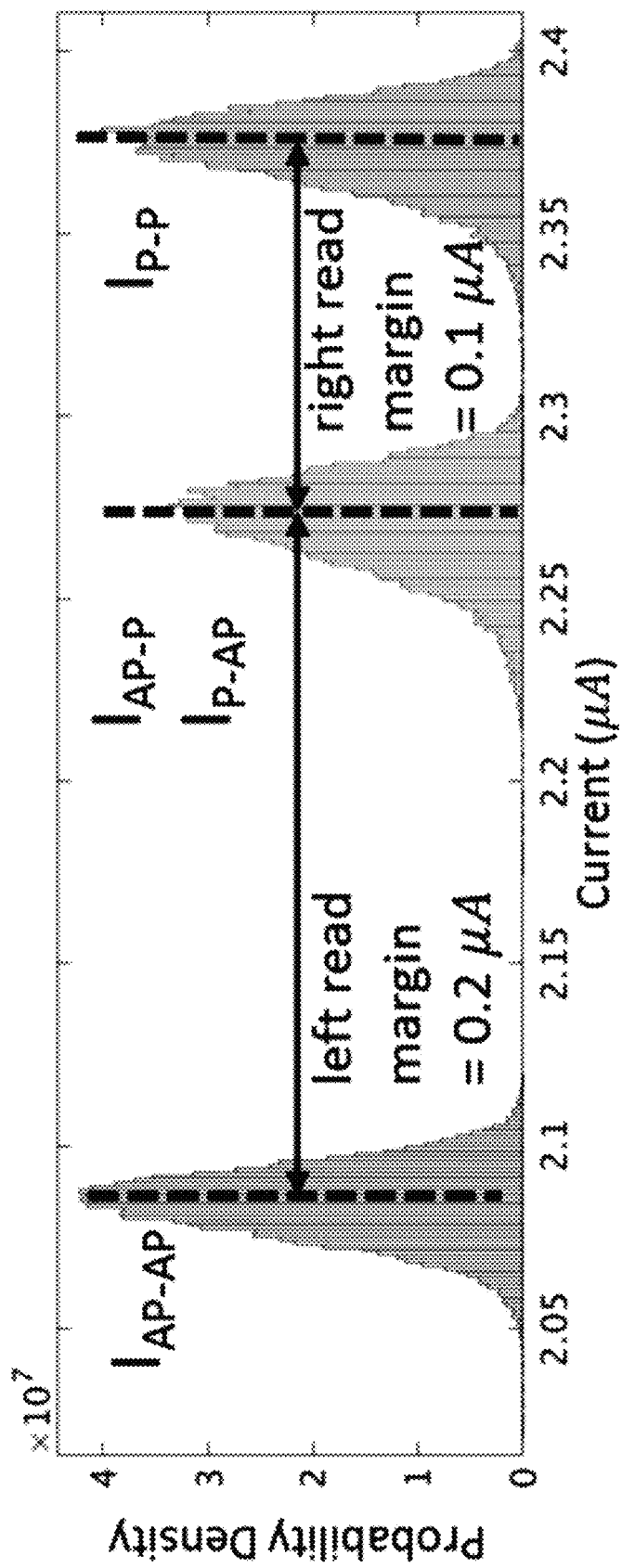
FIG. 7B is a graph of probability of currents during a CIM operation between the associated parallel and antiparallel configurations.

With the components described, attention is now directed to several challenges that CiM operations face. The STT-CiM array suffers from the same failure mechanisms, viz. read disturb failures, read decision failures and write failures, that are observed in a standard STT-MRAM memory array, known to a person having ordinary skill in the art. Normal read/write operations in STT-CiM have the same failure rate as in a standard STT-MRAM, since the read/write mechanism is identical. However, CiM operations differ in their failure rates, since the currents that flow through each bit-cell differ when enabling two word lines simultaneously. In order to analyze the read disturb and read decision failures under process variations for CiM operations, a Monte Carlo circuit-level simulation was performed on 1 million samples considering variations in MTJ oxide thickness ($\sigma/\mu=2\%$), transistor $V_T$ ($\sigma/\mu=5\%$), and MTJ cross sectional area ($\sigma/\mu=5\%$). FIGS. 7A and 7B show the probability density distribution of the possible currents obtained during read and CiM operations on these 1 million samples. As shown in FIG. 7A, the overall current flowing through the source line is slightly higher in case of a CiM operation as compared to a normal read. However, this increased current is divided between the two (or more) parallel paths, and consequently the net read current flowing through each bit cell (MTJ) is reduced. Hence, the read disturb failure rate is even lower for CiM operations than normal read operations.

The net current flowing through the source line (ISL) in case of a CiM operation can have 3 possible values, i.e., $I_{P-P}$, $I_{AP-P}$ ($I_{P-AP}$), $I_{AP-AP}$. A read decision failure occurs during a CiM operation when the current $I_{P-P}$ is interpreted as $I_{AP-P}$ (or $I_{P-AP}$), or when $I_{AP-AP}$ is inferred as $I_{AP-P}$ (or $I_{P-AP}$). Referring to FIG. 7B, a graph of probability density of possible currents (μA) during CiM operations is depicted. In contrast to normal reads, CiM operations have two read margins (shown in FIG. 7B), one between $I_{P-P}$ and $I_{AP-P}$ and another between $I_{AP-P}$ and $I_{AP-AP}$. The Monte Carlo simulation results show that the read margins for CiM operations are lower as compared to normal reads, therefore they are more prone to decision failures. Moreover, the read margins in CiM operations are unequal, thus there may be more failures arising due to the read margin between $I_{P-P}$ and $I_{AP-P}$.

Figure 8:
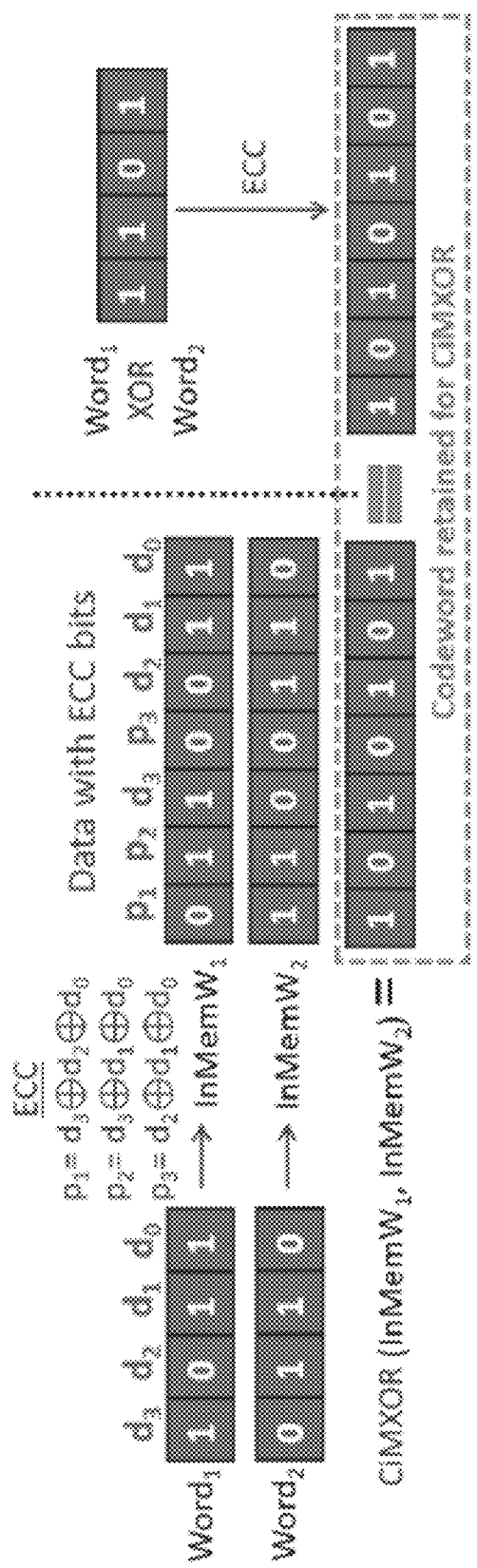
FIG. 8 is a schematic of appending error correction code (ECC) bits to words and demonstrating retention of ECC when an XOR operation is carried out between the words.

In order to mitigate these failures in STT-MRAM, various error correcting code (ECC) schemes have been explored, known to a person having ordinary skill in the art. ECC techniques that provide single error correction and double error detection (SECDED) and double error correction and triple error detection (DECTED) can be used to address the decision failures in CiM operations as well. These schemes are feasible because the codeword properties for these codes are retained for a CiM XOR operation. Referring to FIG. 8, a schematic of codeword retention property of CiM XOR operation using a Hamming code is shown. As provided in FIG. 8, $word_1$ and $word_2$ are augmented with ECC bits ($p_1$, $p_2$, $p_3$) and stored in memory as $InMemW_1$ and $InMemW_2$, respectively. A CiM XOR operation performed on these stored words ($InMemW_1$ and $InMemW_2$) results in the ECC codeword for $word_1$ XOR $word_2$, therefore the codewords are preserved for CiM XORs. This retention property of CiM XORs is advantageously utilized to detect and correct errors in all CiM operations. This ECC scheme is enabled by the fact that the STT-CiM design according to the present disclosure computes bitwise XOR (CiM XOR) irrespective of the desired CiM operation.

Figure 9:
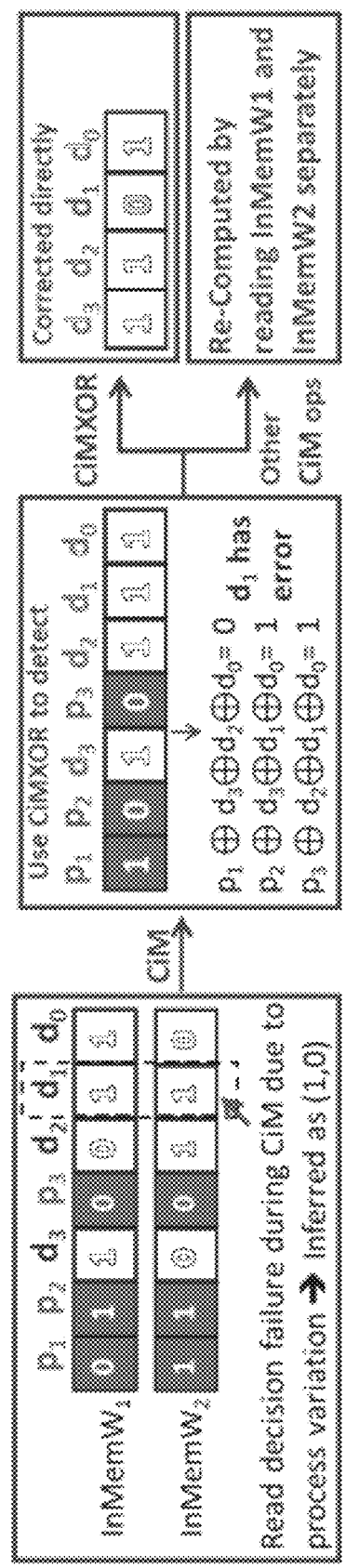
FIG. 9 is a schematic of using an XOR operation to identify bit errors in a CiM operation, as well as error correction if that operation is an XOR.

The error detection and correction mechanism for CiM operations according to the present disclosure is depicted in FIG. 9. Suppose data bit $d_1$ suffers from decision failure during CiM operations, as shown in the figure. As a result, logic '11' ($I_{P-P}$) is inferred as logic '10' ($I_{AP-P}$) which leads to erroneous CiM outputs. An error detection logic operating on the CiM XOR output (shown in FIG. 9) detects an error in the $d_1$ data bit which can be corrected directly for a CiM XOR operation by simply flipping the erroneous bit. For other CiM operations that do not retain codewords, two sequential normal reads on words $InMemW_1$ and $InMemW_2$ are performed to correct the erroneous bits by re-computing them using an error detection and correction unit discussed below. It should be noted that, such corrections lead to overheads, as memory array needs to be accessed 3 times (compared to 2 times in STT-MRAM), thereby reducing the efficiency of STT-CiM. However, a variation analysis shows that corrections on CiM operations are infrequent, leading to overall improvements.

The ECC approach according to the present disclosure uses circuit level simulations to determine the bit level error probability, which is then used to estimate the array level yield. Moreover, the ECC scheme is selected based on the target yield requirement. The simulation shows that 1 bit failure probability of normal reads and CiM operations are $4.2 \times 10^{-8}$ and $6 \times 10^{-5}$ respectively. With these obtained bit-level failure rates and assuming a target yield of 99%, the ECC requirement for 1 MB STT-MRAM is single error correction and double error detection (SECDED), whereas for 1 MB STT-CiM is three error correction and four error detection (3EC4ED). Note that the overheads of the ECC schemes are considered and reflected in the experimental results. Moreover, the simulation shows that the probability of CiM operations having errors is 0.1, i.e., 1 in 10 CiM operations will have an error, which will be detected by using 3EC4ED code on CiM XORs. Further, these errors are directly corrected for CiM XORs using 3EC4ED code, and by reverting to near-memory computation for other CiM operations.

In order to evaluate the application-level benefits of STT-CiM, the following section of the present disclosure provides an integration of it as a scratchpad in a memory hierarchy of a programmable processor. This section describes optimizations to increase the efficiency of STT-CiM and architectural enhancements required to expose it to software.

Figure 10:
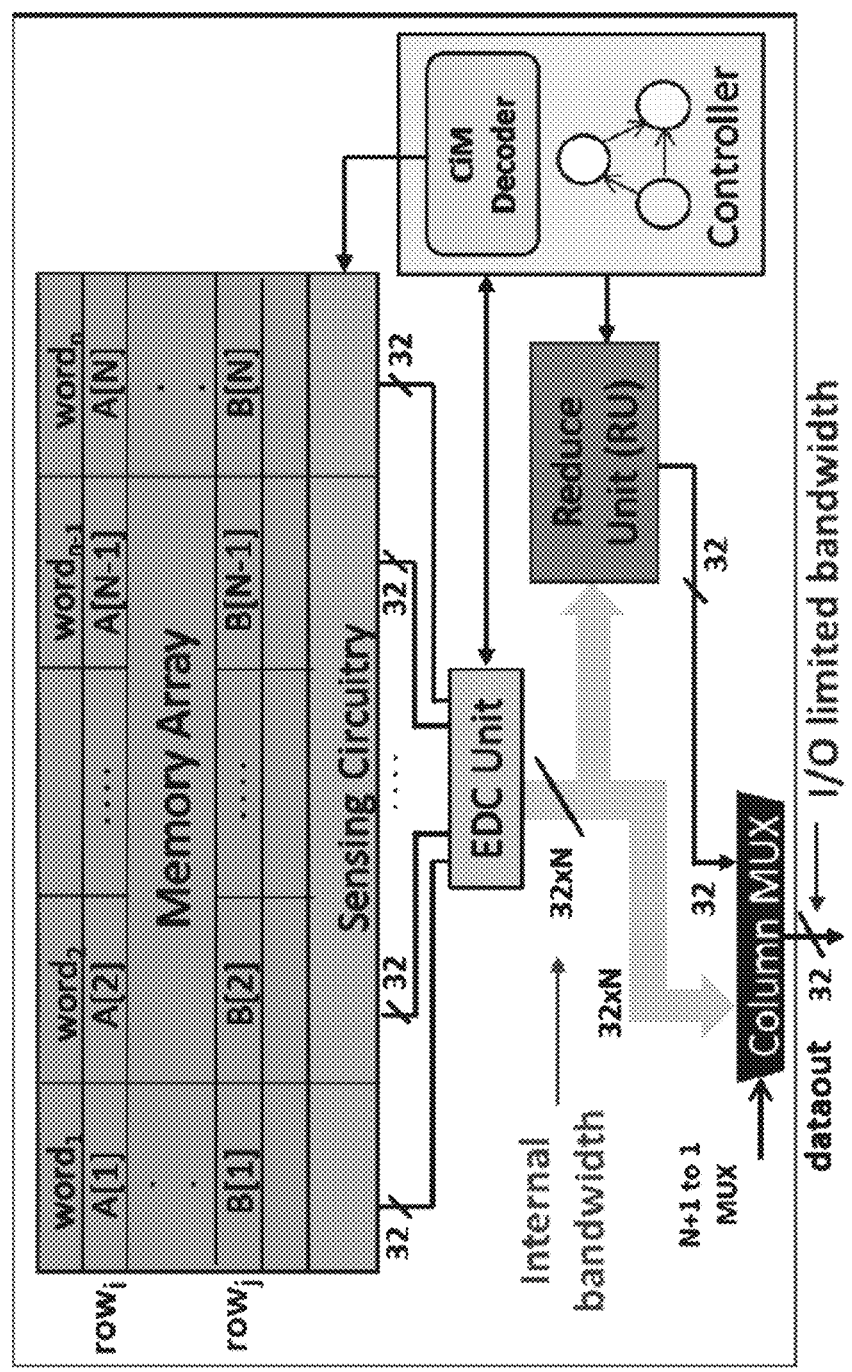
FIG. 10 is a schematic of a system utilizing a reduction unit that advantageously utilized the internal memory bandwidth to improve the limited I/O bandwidth visible to a processor.

Many modern computing workloads exhibit significant data parallelism. To further enhance the efficiency of STT-CiM for such applications, a novel set of operation entitled Vector Compute-in-Memory (VCiM) is provided. VCiM operations advantageously allow exploitation of the internal memory bandwidth to perform CiM operations on the elements of a vector simultaneously. Referring to FIG. 10, a schematic is provided that shows how the internal memory bandwidth (e.g., 32×N bits) can be made significantly larger than the limited I/O bandwidth (e.g., 32 bits) visible to the processor. This internal bandwidth is used to perform vector operations (N words wide) within STT-CiM. It should be noted that the computed vector cannot be directly transferred to processor in one access due to I/O limitations.

To address this issue, the reduction computation patterns commonly observed in several applications is utilized and a novel Reduce Unit (RU) provided as shown in FIG. 10. The RU takes an array of data elements as inputs and reduces it to a single data element. A reduce unit can support various reduction operations such as summation, zero-compare, etc. (shown in Table 4). The overheads of the RU depend on two factors: (i) the number of different reduction operations supported, and (ii) the maximum vector length allowed (can be between 2 to N words). According to one embodiment, to limit the area overheads, two common reduction operations, i.e., summation and zero-compare, and evaluate our design for vector lengths of 4 and 8 are supported. Consider the computation of $$\sum_{i=1}^{N} A[i] + B[i],$$

where arrays A and B are stored in rows i and j respectively (as shown in FIG. 10). To compute the desired function using a VCiM operation, rows i and j are activated simultaneously, and the sensing circuitry activated to perform an ADD operation and the RU configured to perform accumulation of the resulting output. Note that the summation would require 2N memory accesses in a conventional memory. With scalar CiM operations, it would require N memory accesses. With the proposed VCiM operations, only a single memory access is required. In order to realize a wider variety of in-memory operations, we further enhance the proposed RU with a low overhead compute unit. Specifically, this unit enables operations such as Euclidean distance and L1/L2 norms to be computed by STT-CiM.

TABLE 4

Examples of Reduction Operations

| Type | Function<br>RuOut = f (IN$_1$, IN$_2$, . . . , IN$_N$) |
|---|---|
| Summation | RuOut = IN$_1$ + IN$_2$ +.. + IN$_N$ |
| Zero-Compare | RuOut[k] = (IN$_k$ = = 0) ? 0:1 |

As discussed above, to enable correction of erroneous bits for CiM operations, a novel Error Detection and Correction (EDC) unit which implements the 3EC4ED ECC scheme is provided in the present disclosure. The EDC unit checks for errors using the CiM XOR output and signals the controller (shown in FIG. 10) upon detection of erroneous computations. The controller on receiving this error detection signal performs the required corrective actions.

To integrate STT-CiM in a programmable processor based system, the following novel architectural enhancements as compared to known architectures is provided below. An ISA extension set is provided herein for a programmable processor to support CiM operations including but not limited to CiMXOR, CiMNOT, CiMAND, CiMADD that are used to invoke the different types of operations that can be performed in the STTCiM array. In a load instruction, the requested address is sent to the memory, and the memory returns the data stored at the addressed location. However, in the case of a CiM instruction, the processor is required to provide addresses of two memory locations instead of a single one, and the memory operates on the two data values to return the final output.
Format: Opcode Reg1 Reg2 Reg3
Example: OMXOR R$_{ADDR1}$ R$_{ADDR2}$ R$_{DEST}$
These relationships show the format of a CiM instruction with an example. As shown, both the addresses required to perform CiMXOR operations are provided through registers. The format is similar to a regular arithmetic instruction that accesses two register values, performs the computation, and stores the result back in a register.

Figure 11:
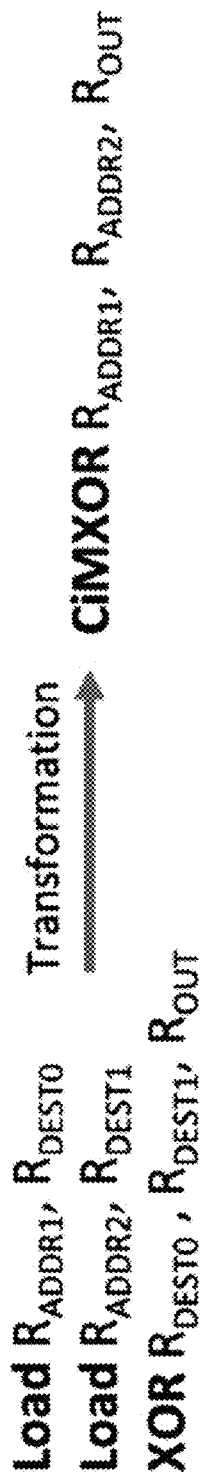
FIG. 11 is a schematic of a transformation where two load instructions followed by an XOR instruction can be mapped to a single CiMXOR instruction.

To exploit the proposed CiM instructions at the application-level, an assembly-level program transformation is performed, wherein specific sequences of instructions in the compiled program are mapped to suitable CiM instructions in the ISA. Referring to FIG. 11, a schematic is provided that shows an example transformation where two load instructions followed by an XOR instruction can be mapped to a single CiMXOR instruction.

In a programmable processor based system, the processor and the memory communicate via a system bus or an on-chip network. These communication schemes make it important to analyze the impact of CiM operations on the bus and the corresponding bus interface. As discussed above, a CiM operation is similar to a load instruction with one difference being that it sends two addresses to the memory. Conventional system buses only allow sending a single address onto the bus via the address channel. In order to send the second address for CiM operations, an unused writedata channel of the system bus is used which is unutilized during a CiM operation. Besides the two addresses, the processor also sends the type of CiM operation (CIMType) that needs to be decoded and performed. Note that it may be possible to overlay the CIMType signal onto the existing bus control signals; however, such optimizations strongly depend on the specifics of the bus protocol being used. In the design according to the present disclosure, 3 control bits (IN$_2$IN$_1$IN$_0$) are added to the bus and account for the resulting overheads. It should be noted that while the case of a shared bus is considered for illustration, the same enhancement discussed above can also be applied to more complex networks without a shared bus architecture. It should also be noted that more than 3 bits can also be used (e.g., 4 bits, IN$_3$IN$_2$IN$_1$IN$_0$, not shown, in order to increase the number of operations from 8 as shown in Table 3 to up to 16 by utilizing these fours control bits).

In order to perform a CiM instruction, the locations of its operands in memory must satisfy certain constraints. Suppose a memory organization including several banks where each bank is an array that contains rows and columns is considered. In this case, a CiM operation can be performed on two data elements only if they satisfy three key criteria: (i) they are stored in the same bank, (ii) they are mapped to different rows, and (iii) they are aligned and placed in the same set of columns. Consequently, a suitable data placement technique is required that maximizes the benefits of STT-CiM. Target applications for STT-CiM have well defined computation patterns, facilitating such a data placement. Referring to FIGS. 12A-12D schematics are provided that show three general computation patterns observed in these target applications.

In a first pattern, see FIG. 12A, the operational scheme involves element-to-element operations (OPs) between two arrays, e.g., A and B. In order to effectively utilize STTCiM for this compute pattern, an array alignment technique (shown in FIG. 12A) is used that ensures alignment of elements A[i] and B[i] of arrays A and B for any value of i. This enables the conversion of operation A[i] OP B[i] into a CiM operation. An extension to this technique is the row interleaved placement shown in FIG. 12B. This technique is applicable to larger data structures that do not fully reside in the same memory bank. It ensures that both the elements, i.e., A[i] and B[i], are mapped to the same bank for any value of i, and satisfy the alignment criteria for a CiM operation.

A second pattern, shown in FIG. 12C, involves a nested loop in which the inner loop iteration includes of a single element of array A being operated with several elements of array B. For this one-to-many compute pattern, a spare row technique for STT-CiM data alignment is provided. In this technique, a spare row is reserved in each memory bank to store copies of an element of A. As shown in FIG. 12C, in the kth iteration of the outer for loop, a special write operation is used to fill the spare rows in all banks with A[k]. This results in each element of array B becoming aligned with a copy of A[k], thereby allowing CiM operations to be performed on them. Note that the special write operation introduces energy and performance overheads, but this overhead is amortized over all inner loop iterations, and is observed to be quite insignificant in our evaluations.

In a third pattern, shown in FIG. 12D, operations are performed on an element drawn from a small array A and an element from a much larger array B. The elements are selected arbitrarily, i.e., without any predictable pattern. For example, consider when a small sequence of characters needs to be searched within a much larger input string. For this pattern, a column replication technique is provided to enable CiM operations, as shown in FIG. 12D. In this technique, a single element of the small array A is replicated across columns to fill an entire row. This ensures that each element of A is aligned with every element of B, enabling a CiM operation to be utilized. Note that the initial overhead due to data replication is very small, as it pales in comparison to the number of memory accesses to the larger array.

An important attribute that allows CiM operations in STT-MRAM is the resistive nature of the bit-cell. This characteristic was advantageously exploited to enable multiple word lines simultaneously and sense the effective bit line resistance to directly compute logic functions of the values stored in the enabled bit-cells. Furthermore, this novel approach was achieved without modifying the bit-cell or the core array structure, and limiting the changes to the peripheral circuitry only. Consequently, this proposal is applicable to similar resistive memory technologies such as Phase Change Memory (PCM) and Resisitve Random Access Memory (ReRAM), known by a person having ordinary skill in the art. It should be noted that both these memory technologies, i.e., PCM and ReRAM use 1 Transistor-1 Resistor bit-cell structure that is similar to the 1 Transistor-1 MTJ bit-cell used in STT-MRAM. Therefore, CiM operation in PCM and ReRAM can be carried out using the same peripheral enhancements (sensing and reference generation circuitry) as described above.

Figure 13:
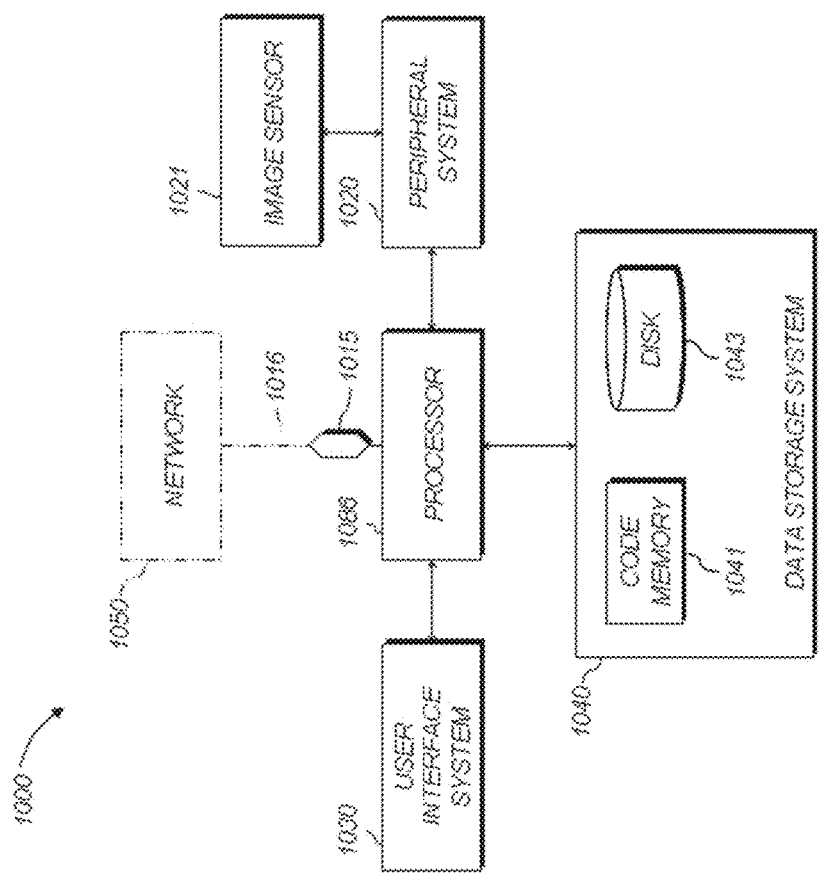
FIG. 13 is a high-level diagram showing components of an exemplary data-processing system, according to the present disclosure.

Referring to FIG. 13, a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those having ordinary skill in the art will recognize that numerous modifications can be made to the specific implementations described above. The implementations should not be limited to the particular limitations described. Other implementations may be possible.

The invention claimed is:

1. A memory capable of carrying out compute-in-memory (CiM) operations, comprising:
    a matrix of bit cells having a plurality of bit cells along one or more rows and a plurality of bit cells along one or more columns, each bit cell having a value stored therein;
    an address decoder configured to receive two addresses simultaneously and activate each of any two rows associated with the two addresses simultaneously; and
    a sensing circuit comprising two sense amplifiers coupled to each column of bit cells, and configured to provide outputs associated with a CiM operation performed on bits stored in any two different bit cells in a column, wherein the CiM operation is selected from the group consisting of NOR, OR, AND, NAND, XOR, and ADD.

2. The memory of claim 1, wherein each bit cell disposed in each column is coupled to a bit line (BL) and a source line (SL) of the associated column, wherein each sensing circuit is coupled to the SL of an associated column.

3. The memory of claim 2, wherein each bit cell includes at least one resistive memory element and at least one access transistor, and wherein each access transistor of each bit cell in a row is activated by a word line (WL) of the associated row and wherein the address decoder activates each row by coupling WLs of the bit cells of the associated row together.

4. The memory of claim 3, wherein each resistive memory element includes a magnetic tunnel junction stack.

5. The memory of claim 3, wherein each resistive memory element includes one or more of phase-change memory elements and resistive random-access memory elements.

6. The memory of claim 3, further comprising:
    a CiM decoder configured to receive two or more different compute operation requests and to generate one or more control signals associated with different compute operations performed by the matrix of bit cells in response to the two or more compute operation requests.

7. The memory of claim 6, further comprising:
    a global reference generator capable of generating three different reference voltages and further which can output a subset of the three reference voltages in response to the one or more control signals.

8. The memory of claim 1, further comprising an error detection and correction (EDC) unit, configured to detect bit errors associated with one or more compute operations based on the values of the bit cells of the activated rows by using a compute in memory XOR operation.

9. The memory of claim 1, further comprising a reduce unit (RU) configured to simultaneously carry out vector compute in memory operations on one or more words of the activated rows.

10. The memory of claim 3, further comprising:
    one or more biasing circuits each coupled to one column of bit cells, and configured to provide a biasing voltage to the BL of an associated column.

11. A method of performing in-memory computing (CiM), comprising:
    providing a matrix of bit cells having a plurality of bit cells along one or more rows and a plurality of bit cells along one or more columns, each bit cell having a value stored therein;
    decoding addresses by receiving two addresses simultaneously and activating each of any two rows associated with the two addresses simultaneously; and
    sensing outputs of multiple in-memory compute operations performed simultaneously on bits stored in any two different bit cells in a column by two sense amplifiers coupled to an each column of bit cells, wherein the CiM operation is selected from the group consisting of NOR, OR, AND, NAND, XOR, and ADD.

12. The method of claim 11, wherein each bit cell disposed in each column is coupled to a bit line (BL) and a source line (SL) of the associated column, wherein each sensing circuit is coupled to the SL of an associated column.

13. The method of claim 12, wherein each bit cell includes at least one resistive memory element and at least one access transistor, and wherein each access transistor of each bit cell in a row is activated by a word line (WL) of the associated row and wherein the address decoder activates each row by coupling WLs of the bit cells of the associated row together.

14. The method of claim 13, wherein each resistive memory element includes a magnetic tunnel junction stack.

15. The method of claim 13, wherein each resistive memory element includes one or more of phase-change memory elements and resistive random-access memory elements.

16. The method of claim 13, further comprising:
receiving two or more different compute operation requests;
decoding the two or more and to generate one or more control signals associated with different compute operations performed by the matrix of bit cells in response to the two or more compute operation requests.

17. The method of claim 16, further comprising:
generating three different reference voltages and outputting a subset of the three reference voltages in response to the one or more control signals.

18. The method of claim 11, further comprising:
error detecting and correcting by an error detection and correction (EDC) unit, configured to detect bit errors associated with one or more compute operations based on the value of the bit cells of the activated rows by using a compute in memory XOR operation.

19. The method of claim 11, further comprising:
providing a reduce unit (RU) configured to simultaneously carry out vector compute in memory operations on one or more words of the activated rows.

20. The method of claim 13, further comprising:
biasing a column of bit cells by one or more biasing circuits, and configured to provide a biasing voltage to the BL of an associated column.

* * * * *